United States Patent [19]

Croft

[11] 4,074,363
[45] Feb. 14, 1978

[54] APPARATUS FOR GENERATING PLASTIC FOAM

[75] Inventor: John C. Croft, Barberton, Ohio

[73] Assignee: Ric-Wil, Incorporated, Brecksville, Ohio

[21] Appl. No.: 724,378

[22] Filed: Sept. 17, 1976

[51] Int. Cl.$^2$ ............................................. B01F 15/02
[52] U.S. Cl. ................................... 366/138; 366/162; 366/177; 366/182; 366/339; 222/145
[58] Field of Search .................. 259/4 R, 4 A, 4 AB, 259/4 AC, 7, 8, 18, 36; 23/252 R, 285; 222/145

[56] References Cited

U.S. PATENT DOCUMENTS

| 3,207,486 | 9/1965 | Rosenthal | 259/8 |
| 3,769,232 | 10/1973 | Houldridge | 259/4 AB |
| 3,790,030 | 2/1974 | Ives | 222/145 |

Primary Examiner—Robert W. Jenkins
Attorney, Agent, or Firm—Watts, Hoffmann, Fisher & Heinke, Co.

[57] ABSTRACT

The disclosed apparatus includes a pair of passages which conduct plastic foam component materials to a reaction chamber where the component materials are combined and a foam producing reaction is effected. A variable flow regulating valve is disposed in each passage to control the volumetric flow rate of the component material passing through that passage. A positively actuated shut-off valve is disposed in each passage downstream of the regulating valve. The shut-off valves are placed downstream of the regulating valves to assure that when the apparatus is not producing foam, the regulating valves will be immersed in the component materials in their passages so the regulating valves will be isolated from any drying action by the atmosphere.

1 Claim, 3 Drawing Figures

APPARATUS FOR GENERATING PLASTIC FOAM

BACKGROUND OF THE INVENTION

The present invention relates generally to apparatus for generating plastic foam, and more specifically to a novel gun-type apparatus which forms part of a non-circulating plastic foam system.

Apparatus of the type described comprises separate sources for the components of the plastic foam, e.g., a polyether and a diisocyanate. The components are separately communicated to a reaction chamber, and the resulting foam is selectively discharged from the chamber so that it can be applied in the manner desired.

The gun-type generating apparatus of the prior art is characterized by the presence of check valves and/or variable flow control valves which are exposed to the atmosphere when the apparatus is not in use. The residue of the plastic foam materials which coats these valves is dried by exposure to air so that the valves can become clogged and inoperative after short periods of use. Consequently, the prior art apparatus must be cleaned frequently in order to assure proper and efficient operation.

SUMMARY OF THE INVENTION

The present invention overcomes the foregoing problems of the prior art and provides a gun-type plastic foam apparatus which is specially constructed to avoid clogging due to drying of the foam materials.

In a preferred embodiment, the invention is comprised of separate fluid passages for the components of the plastic foam, variable flow regulating valves in each passage, and positive actuated shut-off valves in the passages downstream from the flow regulating valves. The shut-off valves are preferably manually operated ball valves or the like. The location of the ball valves downstream from the variable flow regulating valves assures that the latter valves will be immersed in the plastic foam materials at all times and will not be exposed to the atmosphere even when the apparatus is not in use. This arrangement avoids any clogging of the variable flow valves due to drying of the foam materials.

The preferred construction of the new apparatus further comprises a reaction or mixing chamber downstream from the ball valves. A twisted, perforated strip extends along the inside of the chamber. The perforated strip assures proper mixing of the foam materials.

Still another feature of the invention resides in its inexpensive construction. The components of the apparatus consist of standard pipe fittings and conduit which can be easily and quickly connected together.

Other advantages and a fuller understanding of the invention will be had from the following detailed description and the accompanying drawing.

DESCRIPTION OF THE PREFERRED EMBODIMENT

Figure 1:
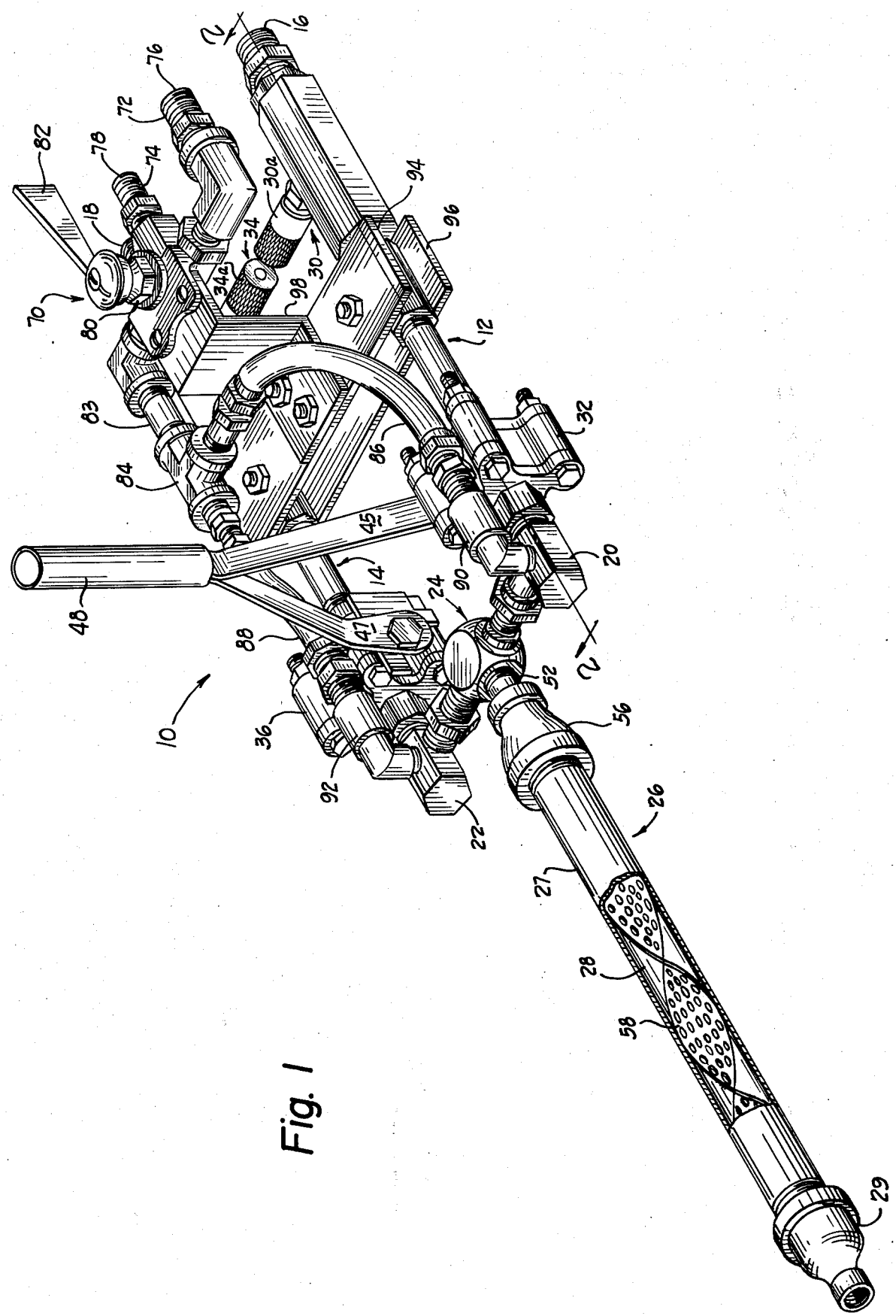
FIG. 1 is a perspective view of a foam gun incorporating features of this invention.

Referring to FIG. 1, a preferred embodiment of the invention is generally designated by reference numeral 10. The apparatus 10 comprises a pair of conduits 12 and 14. The conduits 12, 14 are each connectible at one end to individual supplies of the plastic foam materials. For example, the conduit 12 may be connected at its end 16 with a source of a polyether. The conduit 14 may be connected at its end 18 with a source of an isocyanate. The conduits 12 and 14 are both connected at their opposite ends 20 and 22 to a manifold 24. Component materials which have flowed down the respective conduits 12 and 14 are initially brought together in the manifold 24. A mixing head 26 is disposed in communication with manifold 24. The mixing head 26 is formed by an elongate tubular housing 27 which defines a component mixing or reaction chamber 28. The materials which have entered the manifold 24 from the conduits 12 and 14 pass into the mixing head 26 where they are thoroughly mixed and the plastic foam producing chemical reaction takes place. Plastic foam material produced by the reaction is ejected from the mixing head 26 via a nozzle 29 at the end of the mixing head.

Figure 2:
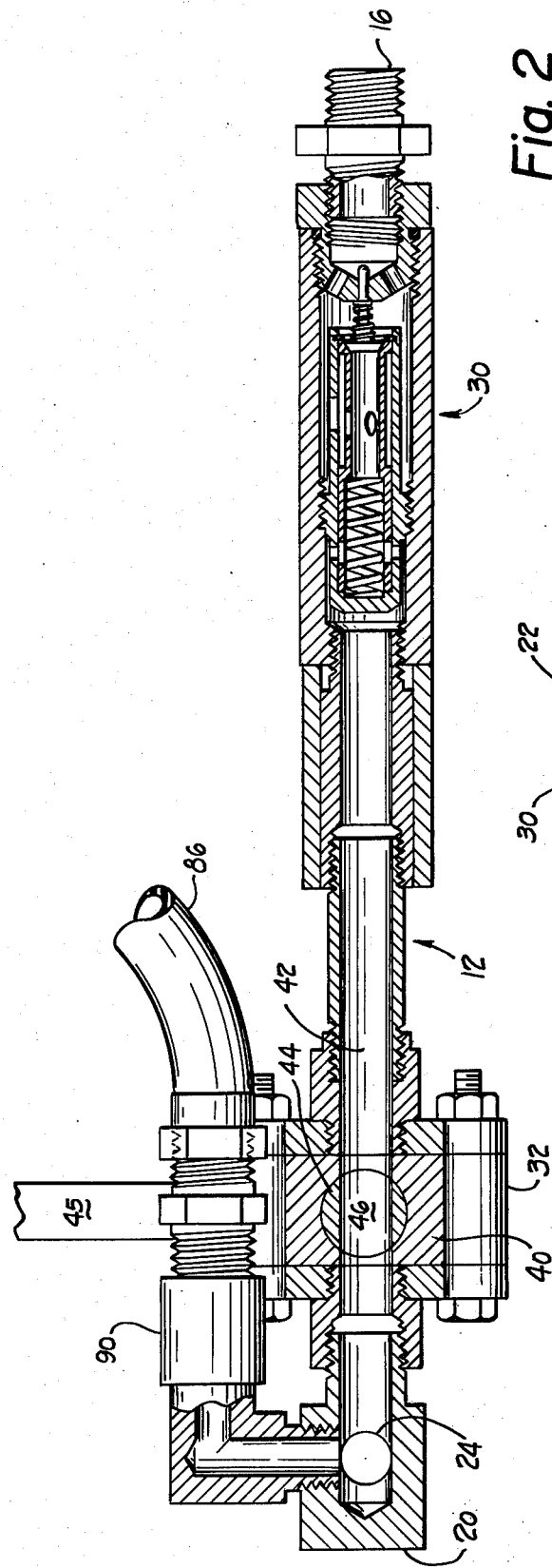
FIG. 2 is an elevation view, partly in section of a portion of the gun illustrated in FIG. 1, viewed from the plane of section 2—2 of FIG. 1.
Figure 3:
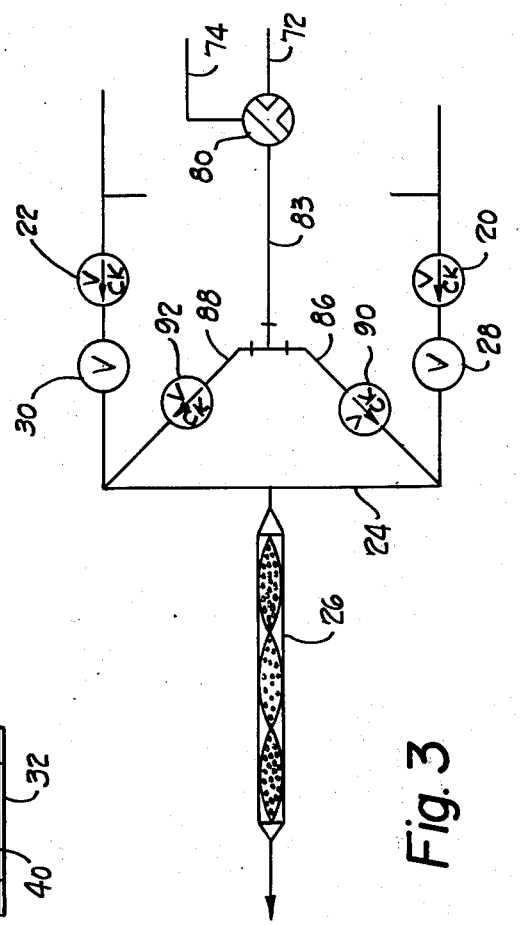
FIG. 3 is a schematic view of the fluid flow system of the gun of FIG. 1.

The respective conduits 12 and 14 are provided with adjustable flow control valves to control the volumetric flow rate of the plastic foam producing materials through the respective conduits. Conduit 12 is provided with a flow control valve 30 while conduit 14 is provided with a flow control valve 34. The flow control valves 30 and 34 are pressure compensated precision flow regulators which include knob adjustment screws 30a and 34a respectively, for adjusting the respective volumetric flow rates. The invention does not limit the gun 10 to any particular flow control valve. However, an Accutrol Regulator, manufactured by Waterman Hydraulics of Chicago, Illinois, is illustrated in FIGS. 1 and 2 for use in combination with the gun. The flow control valves 30, 34 have relatively small adjustable orifices which are subject to clogging if the valves are exposed to atmosphere in the presence of residual foam components. If the flow control valves are completely immersed in their respective foam components, then the valves 30, 34 are isolated from the drying action of the atmosphere. It is therefore desired by this invention to keep the flow control valve interiors completely immersed in their respective foam component whether or not the gun is operational. When the gun is operational, the steady flow of the respective foam component through the respective control valve maintains it immersed and out of contact with the atmosphere. When the gun 10 is temporarily not producing plastic foam and there is no flow of component materials through the gun, additional means must be provided to maintain the valves 30, 34 immersed.

To assure that the flow control valves 30, 34 are immersed in the plastic foam components and thus protected from the atmosphere when the gun is not operating, shut-off valves 32, 36 are provided which are disposed in the respective conduits 12, 14 downstream of the flow control valves 30, 34. When it is desired to stop producing foam, the flow of the foam components through the conduits 12, 14 is terminated by closing the shut-off valves 32, 36 downstream of the flow control valves 30, 34. Consequently, the conduit 12, 14 upstream of the shut-off valves will be filled with foam component materials and the flow control valves 30, 34 will be immersed and therefore protected against any drying action by the atmosphere.

The shut-off valves 32, 36 incorporate positively actuated ball valves to either enable or prevent flow through conduits 12, 14. The shut-off valve 32 is shown in detail in FIG. 2. Shut-off valve 32 includes a housing 40 having a passage 42 therein. The housing 40 rotatably mounts a ball valve 44 supporting a manually actuable handle 45. The ball valve 44 includes a passageway 46 therein. The ball valve handle 45 may be rotated so that the passage 46 may be moved into or out of a coaxially aligned relation with passage 42 to either enable or prevent flow of foam components through the shut-off valve 32. The shut-off valve 36 is constructed similarly to the shut-off valve 32. Valve 36 includes a handle 47 which enables or prevents flow of foam components through the valve 36. The handles 45 and 47 may receive a common sleeve 48. When sleeve 48 is simultaneously placed over both handles the handles are movable together to simultaneously operate both shut-off valves 32, 36.

The conduits 12 and 14 terminate downstream of the respective shut-off valves 32, 36 at conduit end portions 20, 22. The plastic foam components which have passed through the check valves 32, 36 reach the conduits ends 20, 22 and then pass into the manifold 24. The plastic foam components entering the manifold 24 from the opposite ends thereof comingle centrally of the manifold 24 and exit the manifold 24 through a conduit 52 and pass into the mixing head 26.

Within the mixing head 26 the foam components are thoroughly mixed and the foam producing reaction takes place. The tubular housing 27 is connected at one end to the conduit 52 by a fitting 56. The tubular housing is provided with a spiral shaped, perforate blade 58 which extends substantially the length of the housing 27 and which has a diameter substantially equal to the interior diameter of the housing 27. The comingled materials entering the housing 27 from the manifold 24 are thoroughly mixed and agitated as they are forced along twin spiral paths defined by the opposed surfaces of the perforate blade 58. As the foam components progress down the housing to an exhaust nozzle 29 at the opposite end of the housing 27 the plastic foam producing reaction is completed and plastic foamed material is emitted from nozzle 29 into the atmosphere.

The plastic foam gun of this invention may also be provided with a solvent flushing system 70 in order to remove residual foam component materials from gun when it is not operative. The solvent flushing system 70 includes a pair of conduits 72 and 74 which are connectible at their respective ends 76 and 78 with sources of a solvent and pressurized air. Both of the conduits 72, 74 communicate with a three-way valve 80 which supports a handle 82. The valve 80 permits the passage in the alternative of either the solvent or compressed air, or else the valve prevents the passage of either of those materials from their respective conduits through the valve 80. Any material which does pass through the valve 80 passes into a conduit 83 to a T-shaped fitting 84. At the fitting 84, the flow of such material is divided so that such material passes through both conduits 86 and 88 to the end sections 20 and 22 of the respective conduits 12 and 14. In order to prevent reverse flow through the conduits 86, 88 each of them is provided with a respective check valve 90, 92. Solvent or air passing through the flushing system 70 can enter both the conduits 12, 14 and bathe the readily cleaned downstream side of the ball or shut-off valves 32, 36. The solvent or air then can pass into manifold 24, bathing that area before exiting the gun through the mixing head 26.

To support the various components of the gun in a unitized assembly, a bolted frame is provided which includes a pair of upper and lower spaced plates 94, 96 which clamp the respective conduits 12, 14 in a spaced parallel relationship. The upper plate 94, mounts a double right angle section member 98, which supports the valve assembly 80 and conduits 72, 74 of the solvent flushing system 70.

In the operation of this invention, when it is desired to produce a body of plastic foam material, the valve handle 82 for the three-way valve 80 is moved to a closed position to prevent either solvent or air from entering into the conduits 12 and 14 respectively. The sleeve is moved so that both shut-off valves 32, 36 are initially preventing flow. Sleeve 48 is thereafter removed and actuation handle 45 is then rotated from its aligned position with respect to handle 47. By such rotation of handle 45 check valve 32 is opened and enabled to pass foam forming resin material e.g., a polyether therethrough. The knob adjustment screw 30a is then adjusted to calibrate the volumetric flow rate of resin material through the flow control valve 30 and conduit 12. The actuation handle 45 is then rotated back to its position where valve 32 is preventing flow. Actuation handle 47 is then rotated to open check valve 36. The knob adjustment screw 34a is then adjusted to calibrate the volumetric flow rate of a foaming agent, e.g., isocyanate, through conduit 14. The actuation handle 47 is then rotated back to its position where valve 36 is preventing flow. The sleeve 48 is replaced on the now realigned handles. The sleeve encased handles are then rotated as a unit to open the valves 32, 36 and permit the plastic foam components to proceed through the conduits 12, 14 at their respectively controlled flow rates. The flowing component materials pass into the manifold 24 where they initially intermingle before passing into the mixing head 26. Within the mixing head, the perforate spiral strip 58 twists the foam components and mixes then to yield the foam producing reaction.

When it is desired to shut the gun off after it has been used in a foam forming mode, the shut-off valves 32, 36 are shut-off by rotating the sleeve 48 containing handles 45, 47 to close off flow in the respective conduits 12, 14. Consequently, the region of the conduit 12 upstream of the shut-off valve 32 will be filled with resin. The region of conduit 14 upstream of the shut-off valve 36 wil be filled with foaming agent. The flow control valves 30, 34 will be immersed in their respective foam components and will not be exposed to the drying action of the atmosphere when the foam gun not operative. Consequently, there will be no crusting of residual foam component material in these flow control valves and therefore no clogging.

To flush the gun 10 when it is inoperative, the valve handle 82 is rotated from a position which prevents any flow through conduit 83 initially to a position which permits the flow of a solvent, e.g., methylene chloride, through the conduit 72, the valve 80, the conduit 83 the fitting 84 and the conduits 86, 88 to the conduits 12 and 14 respectively. The methylene chloride solvent washes the face of the respective ball valves in the respective shut-off valves 32, 36 and then passes out of the gun. After the gun has been flushed with the solvent, the valve handle 82 is rotated to a second position to prevent further flow of the solvent through the flushing system and to enable the flow of compressed air through the conduit 78, the valve 80 and the remainder of the flushing system to the conduits 12 and 14 respectively. The compressed air dries off the face of the ball valves washed by the solvent and then similarly exits the gun. Thereafter, with the gun now flushed clean and dried, the handle is moved back to its initial position wherein neither solvent or compressed air is permitted to flow. The gun can now be maintained inoperative for a time or it may be operated immediately, as desired.

The components from which the gun is formed are all standard pipe fittings and conduits. Any conventional, positively actuatable ball valve type shut-off valves may be used with the system. As noted above, the flow control valves 30, 34 are also commercially available.

Many modifications and variations of the invention will be apparent to those skilled in the art in the light of the foregoing detailed disclosure. Therefore, it is to be understood that within the scope of the appended claims, the invention can be practiced otherwise than as specifically shown and described.

What is claimed is:

1. Gun-type apparatus for generating plastic foam comprising:
   (a) a pair of conduits each connectible at one end to individual supplies of foam material,
   (b) an adjustable flow control valve in each conduit,
   (c) a manually actuated ball valve in each conduit downstream from each said flow control valve,
   (d) adjacent operating handles extending from said ball valves,
   (e) means for selectively connecting said handles together for joint actuation, said connecting means being operably disassociable from said handles to permit individual actuation thereof,
   (f) a manifold connected to said conduits downstream from said ball valves,
   (g) a tubular mixing head connected to said manifold,
   (h) twisted perforated strip means extending lengthwise of said mixing head and dividing the interior of said into spiral mixing paths that communicate with each other along the length of said strip through its perforations,
   (i) a pressurized air inlet,
   (j) a solvent inlet,
   (k) passageway means connecting said inlets to said conduits at locations downstream from said ball valves,
   (l) selector valve means for selectively communicating each of said inlets to both of said conduits,
   (m) check valve means in said passageway means enabling fluid flow from said inlet means to said passages, but preventing flow in the opposite direction, and
   (n) frame means supporting and connecting all of the foregoing as a unitized assembly.

* * * * *

UNITED STATES PATENT AND TRADEMARK OFFICE
CERTIFICATE OF CORRECTION

PATENT NO. : 4,074,363
DATED : February 14, 1978
INVENTOR(S) : John C. Croft

It is certified that error appears in the above-identified patent and that said Letters Patent are hereby corrected as shown below:

Col. 3, line 45, "foamed" should be -- foam --
Col. 4, line 55, after "gun" insert -- is --
      line 63, after "83" insert -- , --
Col. 3, line 9, "passageway" should be -- passage --
Col. 4, line 51, "wil" should be -- will --
Col. 5, line 10, "or" should be -- nor --
Col. 6, line 14, after "said" and before "into" insert -- mixing head --

Signed and Sealed this

Sixth Day of June 1978

[SEAL]

Attest:

RUTH C. MASON
*Attesting Officer*

DONALD W. BANNER
*Commissioner of Patents and Trademarks*